United States Patent [19]
Fitter et al.

[11] Patent Number: 5,712,771
[45] Date of Patent: Jan. 27, 1998

[54] POWER CONVERTER

[75] Inventors: Johan Christiaan Fitter, 51 Mount Street, Bryanston, Sandton; Jan Abraham Ferreira, Ruiterhof; Philippus Coenraad Theron, Auckland Park, all of South Africa

[73] Assignee: Johan Christiaan Fitter, South Africa

[21] Appl. No.: 339,003

[22] Filed: Nov. 14, 1994

[30] Foreign Application Priority Data

Nov. 12, 1993 [ZA] South Africa .................. 93/8447

[51] Int. Cl.$^6$ .................................................. H02M 3/335
[52] U.S. Cl. ........................................ 363/17; 315/307
[58] Field of Search ............................. 363/17, 18, 21, 363/37, 97, 98; 219/626; 315/307

[56] References Cited

U.S. PATENT DOCUMENTS

| | | | |
|---|---|---|---|
| 4,346,332 | 8/1982 | Walden | 315/307 |
| 4,820,891 | 4/1989 | Tanaka et al. | 219/10.77 |

FOREIGN PATENT DOCUMENTS

| | | | |
|---|---|---|---|
| 1314683 | 4/1973 | United Kingdom | H02M 1/18 |
| 2253077 | 5/1992 | United Kingdom | G05F 1/66 |

OTHER PUBLICATIONS

"Electronic Welder With High–Frequency Resonant Inverter" L. Malesani et al. 1993 IEEE Industry Application Conference Record, pp. 1073–1080.

"The Partial Series resonant Converter: A New Zero Voltage Switching Converter With Good Light Load Efficiency", P.C. Theron et al, IEEE Industry Application Society 1993 Conference Record, pp. 835–840.

Primary Examiner—Peter S. Wong
Assistant Examiner—Rajnikant B. Patel
Attorney, Agent, or Firm—Ladas & Parry

[57] ABSTRACT

A power convertor has a partial series resonant convertor circuit for supplying power at a substantially constant level to a load of variable impedance, and a control circuit for controlling the operation of the convertor circuit. The control circuit includes sensing lines for sensing a variation in load impedance below a threshold value, and regulating means responsive to the sensing lines for reducing the power supplied to the load by lowering an input control signed to a voltage-controlled oscillator. The control circuit is arranged to operate the convertor circuit in a first normal load mode in which the impedance of the load is above the threshold value and a second reduced load mode in which the impedance of the load is below the threshold value so as to limit a rise in current through the load. The invention extends to a method of controlling a power convertor.

15 Claims, 2 Drawing Sheets

POWER CONVERTER

BACKGROUND TO THE INVENTION

Electrical power converters, or switch-mode power converters (SPC's), which include choppers and inverters, have always used some form of current limiting means to prevent overloading of the output of the converter, which may lead to excessive and potentially damaging current flowing in the circuit.

Such current limiting means may comprise resistors or reactors, the latter including inductors and capacitors. Electronic assistance is frequently used, in which the output current is monitored. When such current exceeds a predetermined monitoring value, the duty cycle or frequency of operation of the semiconductor switches of the converter is adjusted to produce a reduction in output current to a safe, desired value.

It is a widely held conception that a series inductor need be included in the output circuit of the SPC when used for welding and battery charging, in order to filter the current.

An inductor is, however, not required in the output circuit of certain resonant SPC's operated at high frequencies, thereby providing significant savings in circuit complexity. A prior art converter which is used for electric or arc welding is described in the paper, "Electronic Welder with High Frequency Resonant Inverter", by L Malesani et al, in the 1993 IEEE Industry Application Conference Record, pp 1073–1080. (The Malesani converter).

In the Malesani converter, a circuit is provided in which current in inductive and capacitive elements is brought into oscillation by means of semiconductor switches. A transformer is connected with its primary to the inductive-capacitive oscillating network, and its secondary to a load via a rectifier. A capacitor is also shunted across the load, which is formed by an arc discharge. The output current is varied by changing the switching frequency of the semiconductor switches. The transfer relationship between frequency and output current is very complicated, requiring special adaptive circuitry, and need not be dealt with for the purposes of this patent application.

In the Malesani converter the semiconductor switches are operated by a control circuit. The output current is monitored by means of a sensor. The controller regulates the output current by comparing the measured current with a reference value which is preset to a desired value by welding personnel. The maximum reference value corresponds to the maximum output current. An error between the reference value and the current measurement results in the controller changing the operation of the semiconductor switches by an amount which reduces the error to practically zero.

Since the value of the current delivered to the load is being determined by the operation of the switch-mode power converter, in conjunction with a sensor and a controller, this method of control invariably unavoidable delay in response time.

Another example of a resonant SPC which provides a capacitive output filter is described in the paper, "The Partial Series-Resonant Converter, a Zero-Voltage Switching Converter With Good Light Load Efficiency", by Theron and Ferreira, IEEE Industry Application Society 1993 Conference Record, pp 835–840 (The Theron-Ferreira Converter). The Theron-Ferreira converter forms the subject matter of South African patent no. 92/2686, the contents of which are by reference included as part of this disclosure.

The Theron-Ferreira converter circuit uses a different configuration of inductive and capacitive elements and achieves intermittent oscillation of the elements by means of the semiconductor switches and freewheel diodes.

This converter is somewhat easier to control because it has a wider switching frequency range and because the output power is proportional to the switching frequency within a certain range of output voltages.

It does, however, still require output current to be monitored, and a controller is required to regulate the output current in a manner similar to that of the Malesani converter, in order to effect reasonably predictable current variation and limitation.

SUMMARY OF THE INVENTION

According to a first aspect of the invention there is provided a power convertor comprising a power supply circuit arranged to supply power at a substantially constant level to a load of variable impedance and a control circuit for controlling the operation of the power supply circuit, the control circuit including first sensing means for sensing a variation in load impedance below a lower threshold value, and first regulating means responsive to the sensing means for reducing the power supplied to the load, the control circuit being arranged to operate the power supply circuit in a first normal load mode in which the impedance of the load is above the threshold value and the power supplied to the load is maintained at a substantially constant level and a second reduced load mode in which the impedance of the load is below the threshold value and the level of power supplied to the load is reduced so as to limit a rise in current through the load.

In a preferred form of the invention, the control circuit includes second sensing means for sensing a variation in load impedance above an upper threshold value, and second regulating means responsive to the second sensing means for increasing the voltage across the load when the load impedance is above the upper threshold value.

Preferably, the first sensing means is coupled directly to an output of the power supply circuit, the control circuit includes a sub-controller, and the first sensing and regulating means is arranged to lower an input control signal to the sub-controller.

Conveniently, the first sensing means comprises first voltage sensing means for sensing a drop in voltage across the load below a predetermined threshold, the drop in voltage arising from an increase in current through the load.

Alternatively, the first sensing means comprises first current sensing means for sensing an increase in current through the load above a predetermined threshold, the increase in current arising from a voltage drop across the load.

Advantageously, the first regulating means is arranged to lower the input control signal by sinking current via the first sensing means.

Typically, the input control signal comprises a DC reference voltage, and the control circuit includes a DC voltage source for supplying the reference voltage to the sub-controller, and adjustment means operative in the normal load mode for manually adjusting the DC voltage source for varying the level of substantially constant power supplied to the load.

Typically, the sub-controller comprises a voltage controlled oscillator arranged to supply variable frequency pulses to controlled switches forming part of the power supply circuit.

In a preferred form of the invention, the power supply circuit includes a reactive energy storage circuit with the power supplied to the load being derived from discrete substantially constant power pulses.

Typically, the output power level of the convertor is determined by the frequency or duty cycle of the power pulses.

In one form of the invention, the first sensing means comprises a voltage sensing line coupled between an output of the power supply circuit and an input of the sub-controller, and the first regulating means includes reverse biasing means for preventing current from flowing from the load via the sensing line in the event of the voltage at the output of the power supply circuit exceeding the voltage at the input of the sub-controller and for allowing current to flow in the opposite direction in the event of the voltage at the input of the sub-controller exceeding the voltage at the output of the power supply circuit by a predetermined value.

Advantageously, the second sensing means is coupled directly to an output of the power supply circuit, the control circuit includes a sub-controller, and the second sensing and second regulating means are arranged to lower an input control signal to an input of the sub-controller.

Conveniently, the second regulating means includes a voltage reference means which is arranged to conduct in the event of the voltage at the output of the power supply exceeding the voltage of the input control signal by a predetermined value, and switching means responsive to conduction of the voltage reference means, the switching means being arranged to divert current from the input of the sub-controller.

Typically, the sub-controller is a voltage controlled oscillator having an output coupled to a firing circuit, and the power supply circuit is a converter circuit which is provided with at least two controlled switches arranged to receive pulsed signals from the firing circuit, and further arranged to operate in a high output voltage mode in response to the frequency of the pulsed signals falling below a predetermined threshold.

The invention extends to a method of controlling a power convertor comprising a power supply circuit arranged to supply power at a substantially constant level to a load of variable impedance and a control circuit for controlling the operation of the power supply circuit, the method including the steps of:

a) sensing the load impedance;
b) operating the power supply circuit in a first normal load mode in the event of the impedance of the load being above a first lower threshold value by maintaining the power supplied to the load at a substantially constant level;
c) operating the power supply circuit in a second reduced load mode in the event of impedance of the load being below the first threshold value by reducing the level of power supplied to the load so as to limit a rise in current through the load.

Advantageously, the method includes the step of operating the power supply circuit in the third increased load mode in the event of the impedance of the load being above an upper threshold value so as to increase the voltage across the load.

Conveniently, the load impedance is sensed by sensing a variation in voltage across the load arising from an inversely proportional variation in current through the load.

BRIEF DESCRIPTION OF THE DRAWINGS

An embodiment of the invention is described below, by way of example only and with reference to the accompanying drawings in which.

DESCRIPTION OF EMBODIMENTS

Figure 1:
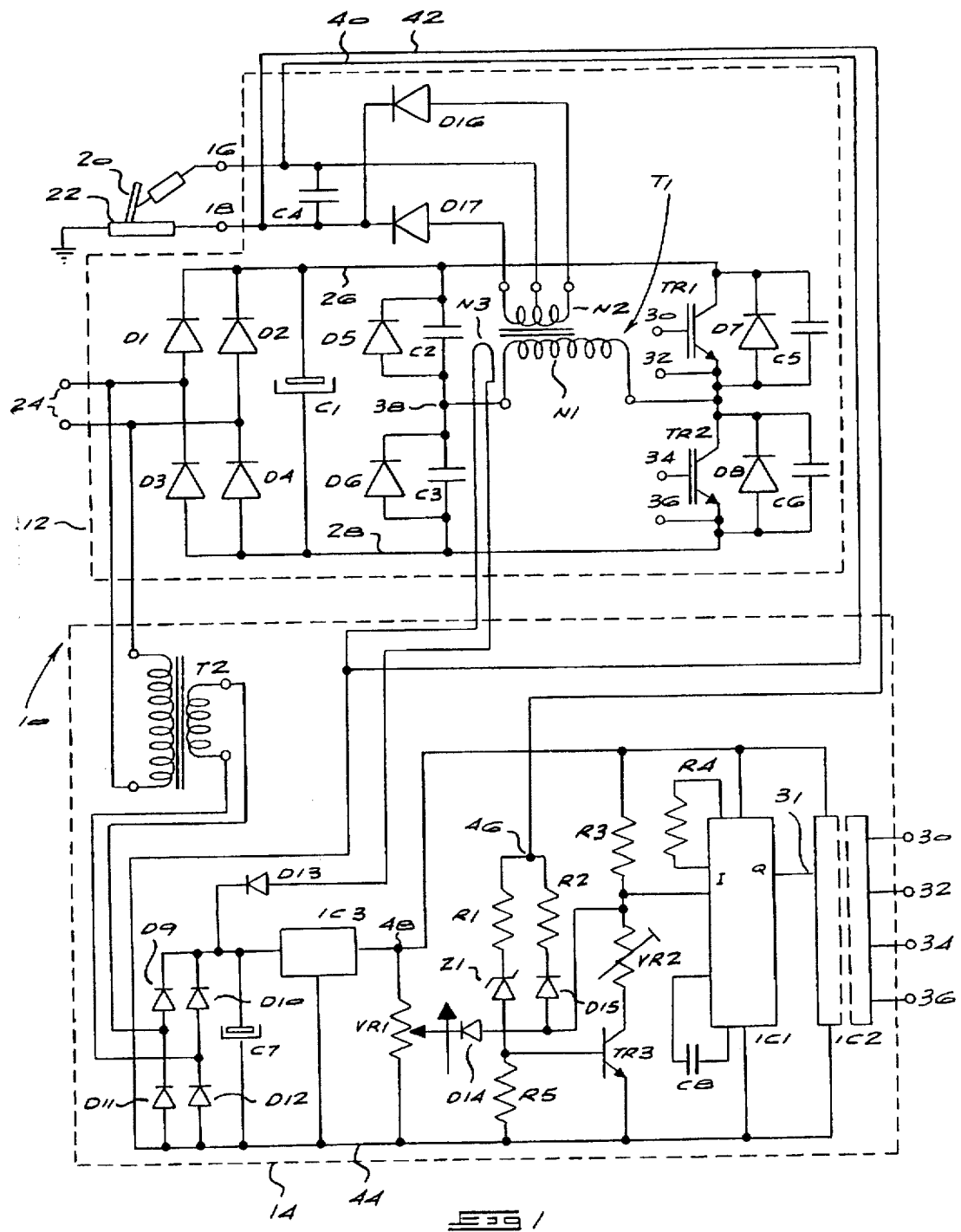
FIG. 1 is a circuit diagram of a DC arc welder of the invention.

Referring first to FIG. 1, a circuit diagram of a DC arc welder 10 comprises a cyclic reactive energy storage circuit which in this embodiment is a partial series resonant converter circuit which is indicated in broken outline at 12. The converter circuit 12 is controlled by means of a control circuit indicated in broken outline at 14. The function and operation of the control circuit will be described in more detail below.

The partial series resonant converter circuit 12 is similar to the partial series resonant converter circuit disclosed in South African Patent No. 92/2686, the contents of which are by way of reference included as part of this patent specification. The operation of the converter circuit 12 is fully described in the specification South African Patent No. 92/2686, and the layout of the components of the converter circuit will only be briefly described for completeness in this description.

The converter circuit 12 has output terminals 16 and 18 which are connected to an arc discharge output in the form of a welding rod 20 and plate 22 which is constituted by a workpiece on which the welding operation is being performed. Utility power is connected to input terminals 24. Diodes D1, D2, D3 and D4 are connected as a single phase, full wave rectifier. The rectified output from the diodes is filtered by a capacitor C1 and a substantial direct current (dc) voltage is therefore provided between rails 26 and 28.

The rails 26 and 28 are bridged by two small-value series-linked capacitors C2 and C3, which have a value of about 0.75 microfarads each. Two Insulated Gate Bi-polar Transistors (IGBT's) TR1 and TR2 are also connected in series with each other between the rails 26 and 28. The capacitor C2 is shunted by a clamping diode D5 and the capacitor C3 is shunted by a clamping diode D6. The transistor TR1 is shunted by a freewheel diode D7 and a capacitor C5, and the transistor TR2 is shunted by a freewheel diode D8 and a capacitor C6.

A transformer T1 has one end of its primary winding N1 connected to the common node of capacitors C2 and C3, and the other end connected to the common node of transistors TR1 and TR2. The transformer has two secondary windings N2 and N3. Winding N2 is connected with a centre tap to an output rectifier comprising diodes D16 and D17. This configuration provides full wave rectification with only two rectifier diodes. It is however also possible to use a single secondary winding without centre tap and a four-diode bridge rectifier.

A capacitor C4 is shunted directly across the output terminals 16 and 18. In use the leads linking the transformer secondary N2 to the diodes D16 and D17 and to the capacitor C4 are arranged to provide minimum inductance to avoid unnecessary voltage drop.

The remaining winding N3 comprises a single turn of hook-up wire wound around the primary winding N1. It does not form part of the power converter circuit 12 but serves to provide power to the control circuit 14 through diode D13.

A small auxiliary start-up transformer T2 is also connected to the utility power at the input terminals 24. Its primary winding matches the incoming utility voltage, and its secondary winding is arranged to deliver 15 volts AC.

The transformer T2 may be rated as low as 1 VA, and its output is rectified by a bridge rectifier comprising diodes D9, D10, D11 and D12. A capacitor C7 provides filtering of the rectifier output, and may be rated at about 470 microfarads. A monolithic voltage regulator IC3, which may be type 7815, provides a 15 volt stabilised output to regulate the voltage supply to the control circuit 14.

During operation of the converter, the power requirements of the control circuit quickly exceed the rating of the start-up transformer T2. However, the single turn winding connected to diode D13 provides entirely adequate power for the control circuit, as soon as the converter comes into operation, by furnishing approximately 25 volts across capacitor C7, while transformer T2 was furnishing only about 18 volts prior to the converter coming into operation. It follows that as soon as the 25 volts are provided, transformer T2 effectively ceases to supply power to the control circuit 14.

The main component of the control circuit 14 is a voltage controlled oscillator (VCO) IC1. This may be a type 4046, which provides a linear transfer of input voltage to output frequency. The phase locked loop section of this device is left unused and only the VCO section is used. The maximum frequency of oscillation is determined by the values of R4 and C8.

The input voltage to the VCO IC1 is supplied via a pull-up resistor R3. A variable resistor VR1 and a diode D14 divert some of the current following flowing through the resistor R3 to ground, depending on the setting on variable resistor VR1. Variation in the setting of the variable resistor VR1 will therefore result in a corresponding variation in the reference voltage applied to the input I of the VCO IC1.

The inclusion of the diode D14 with indicated polarity allows a potential value at the input I of the VCO to be additionally governed by a diode D15 or a transistor TR3 under certain load conditions which will be described in more detail further on in the specification. The diodes D14 and D15 and the transistor TR3 in combination are roughly analogous to an analog OR gate in which the set-point potential or the load potential presented at one of the three inputs controls the operation and state of the VCO IC1.

The minimum frequency of oscillation is effectively zero hertz, achieved by reducing the reference voltage signal at input I of the VCO to a value below approximately 1.65 volts. In this embodiment, the maximum frequency setting of the VCO is 50 kHz. This frequency is achieved by raising the reference voltage signal to a value of not less than 1.35 volts below, but not exceeding, the supply voltage of 15 volts.

The VCO IC1 has an output Q which is connected to an input 31 of a firing circuit IC2. The operation and application of this type of firing circuit is well known and need only be described in brief for the purpose of this specification. The firing circuit IC2 has four output terminals 30, 32, 34 and 36 which are connected to transistors TR1 and TR2. The output terminal 30 is connected to the gate of TR1 and the output terminal 32 is connected to the emitter of TR1. Likewise, the output terminal 34 is connected to the gate of TR2 and the output terminal 36 is connected to the emitter of TR2. The VCO IC1 generates a square wave which represents the desired frequency of operation of the power converter. Galvanic isolation is provided between the input 31 and outputs 30, 32, 34 and 36, as well as between the respective outputs of the firing circuit IC2.

A positive-going edge applied to the input 31 of IC2 produces a positive pulse at the output 30 to turn TR1 on, and fractionally thereafter produces a negative pulse at output 34 to turn TR2 off. A negative-going edge applied to the input of IC2 produces a negative pulse at output 30 to turn TR1 off, and produces a positive pulse at output 34 to turn TR2 on, with turn-off always fractionally preceding turn-on. Consequently, the transistors TR1 and TR2 are never simultaneously in an on-state and have alternating on-off cycles.

In operation, the character of the pulses applied to the gates of TR1 and TR2 is affected by the capacitance presented by the gates. A pulse of positive polarity results in a positive edge followed by a substantially continuous positive potential remaining present at the gate, as is the case with for a negative pulse. This assists the transistors TR1 and TR2 in maintaining their on states and their off states between the switching transitions with a greater degree of reliability.

In this embodiment, the transformer T1 is wound on ferrite "E" cores, the core assembly comprising two "E"s aligned in the same plane abutting in opposition, with a graduated gap separating each of the three in-line pairs of limbs.

The centre-tapped secondary winding N2 is wound by winding a flat metal strip material around the middle limb of the transformer core, the width of the strip being arranged to fit substantially across the length of the end-to-end centre limbs, on a suitable bobbin. Each successive turn of the secondary winding N2 is wound over the previous turn. The secondary windings N2 are covered with insulating interleaving, and the entire secondary winding assembly is fully insulated.

The primary winding N1 consists of multiple strands of individual insulated strands of metal wire, bared only at the extremities, where they are bonded together to form the transformer primary winding terminal connections. The primary winding N1 is wound over the secondary, with each successive turn adjacent the next turn, so as to form a single layer coil, occupying substantially the same width as the secondary winding N2.

The primary winding N1 is wound right onto the insulated secondary winding assembly over three-quarters of each turn, with the non-contacting quarter turns emerging as adjacent loops of substantial size from one side of the transformer assembly.

This looping of the primary windings increases the leakage inductance of the transformer, effectively placing an extra inductance in series with the primary winding T1 of the transformer. This additional inductance amounts to about 5 micro-henries. The gapping of the transformer cores is specifically aimed at lowering the self inductance of the primary winding, a value of roughly 50 to 100 micro-henries being required.

The electrical equivalent of transformer T1 has an additional inductance Ls of about 5 micro-henries in series with the primary, and a further inductance Lp of about 50–100 micro-henries in parallel with the primary coil N1.

These two additional inductances play an essential role in the operation of the converter. They resonate with capacitors C2 and C3. During this resonance the energy stored in capacitors C2 and C3 is equal to:

$$\tfrac{1}{2}(C_2+C_3) V^2 \text{ supply} \tag{1}$$

On the basis of this equation, it is clear that the converter is designed to deliver constant power to the load, provided the supply voltage remains constant.

During the resonance interval part of this energy goes to the load and the remainder is stored in the two inductances Lp and Ls. After resonance the energy stored in Ls is delivered to the load, while the current flowing through Lp ensures that the voltage at node 38 swings up to the potential at the rail 26 or alternately swings down to the potential of rail 28, in which case diode D5 or diode D6 will be conducting. The operation of these two inductances is described in more detail in the complete specification of South African Patent 92/2686.

The operation of the control circuit will now be described with reference to an actual welding operation of the converter.

After an arc has been struck at the arc discharge point between the welding rod 20 and the workpiece 22, approximately 23 volts appears across the terminals 16 and 18. The output current is approximately 180 amps. The potential between the output terminals 16 and 18 is sensed at the control circuit 14 via sensing lines 40 and 42. The sensing line 40 extends between the ground terminal 16 and a ground rail 44 of the control circuit, and the sensing line 42 extends between the positive output terminal 18 and a sensing node 46. The sensing node 46 is serially connected to the input terminal I of the VCO IC1 via the resistor R2 and the reverse biased diode D15. The sensing node 46 is also connected to the ground rail 44 of the control circuit via a resistor R1, a zener diode Z1 and a resistor R5. There will be no current flowing through either resistor R1 or resistor R2. Therefore the VCO IC1 frequency will be determined by the setting of potentiometer VR1, without any override from the control circuitry. By varying the setting of potentiometer VR1, the power fed to the arc will vary immediately.

In the normal mode of operation, the potential at the sensing node 46 stands at approximately 23 volts, whereas the potential at the input I of the VCO is held below 15 volts, depending on the setting of VR1. Consequently, the diode D15 is reversed biased and the zener diode Z1 is non-conducting, as a result of which no current flows in either direction through the sensing line 42. During operation of the power converter of the normal mode described above, the power across the load is substantially constant, in accordance with formula (1), and is determined solely by the setting of the potentiometer VR1. The setting of potentiometer VR1 in turn determines the output frequency of the VCO IC1, which controls the output power level of the convertor.

During normal stick welding, drops of metal coalesce at the tip of the welding rod electrode 20 and are transferred intermittently from the welding rod 20 into the pool of molten metal formed in the workpiece 22. The drops bridge out the arc gap, producing an abrupt and very significant reduction in load impedance, lasting the duration for which each successive drop bridges out the arc gap. As each drop bridges the gap, the voltage across terminals 16 and 18 fails to almost zero, and the current begins to climb very rapidly. The charge present in capacitor C4 is available for discharge into the load.

When such a short circuit condition occurs the voltage present at terminal 18 is low enough (ie less than 15V) so as to forward bias the diode D15. Current flows via resistor R3, diode D15, and resistor R2 into the load. This current is only a few milliamps, but is sufficient to reduce the reference voltage at input I of the VCO, IC1.

The frequency of oscillation of the VCO IC1 will therefore fall, depending on the values of resistors R2 and R3 and the exact voltage at terminal 18 with respect to terminal 16.

The values of resistors R2 and R3 are approximately 22 kΩ and 220 kΩ respectively, but are highly variable, being chosen experimentally and in conjunction with the circuit impedances of the power converter to permit current in the bridged arc gap to rise to no more than 500 amps. When the drop "clears", the current immediately restores to its former value of 180 amps as the voltage at sensing node 46 decreases to a value which causes the diode D15 to be reverse biased. Pull-up resistor R3 thus restores the reference voltage at node 48 to the input of the VCO.

When striking an arc, it is necessary to touch the rod to the workpiece briefly, and then to lift it away very slightly. During this brief short, the output voltage will fall to zero, and the VCO frequency will be similarly reduced, but to a greater extent. The current passing through this short will also be limited to a 500 amps maximum.

Upon lifting the rod away from the workpiece altogether, the arc will be extinguished and the voltage will immediately begin to rise between the output terminals 16 and 18. The supply voltage between rails 26 and 28 and the transformer T1 turns ratio provides sufficient voltage on open circuit to drive the output almost immediately to at least 35 volts. The rate of rise is only limited to a small extent by the capacitor C4 which is shunted across the output terminals.

Resistor R1 has a very small value of about 4.7 kΩ, having a value calculated to limit the current via zener Z1 and the base of the transistor TR3 to a safe value.

The value of the zener Z1 is about 33 volts. It follows that as soon as the output voltage between terminals 16 and 18 rises to above the sum of the zener voltage, the emitter-base diode drop of TR3, and the small voltage drop across resistor R1, which amounts to a total of approximately 34 volts, the transistor TR3 will be turned on. Transistor TR3 will rapidly go into saturation and the voltage at the collector of transistor TR3 will thus drop to almost zero volts. The variable resistor VR2 has a very small value of a few kΩ, as a result of which the reference voltage to the VCO is reduced to a value of fractionally over 1.65 volts, which will allow the frequency of oscillation of the VCO to be about one or two hertz.

At this very low switching frequency the converter changes to its "high output voltage" mode of operation, during which the parallel inductance Lp discharges capacitors C2 or C3 completely after each pulse, to raise the output voltage of the converter from half the potential across rails 26 and 28 multiplied by the secondary-to-primary turns ratio of the transformer T1, to the full potential across rails 26 and 28 multiplied by the secondary-to-primary turns ratio of the transformer.

During open-circuited load conditions, the converter remains in its very slow switching frequency mode until a load impedance of sufficiently low value to discharge capacitor C4 significantly within about half a second is presented across the output, upon which the output voltage will fall, the transistor TR3 will be turned off, and normal converter operation resumes. The open circuit voltage is typically 75 to 80 volts, which is safe, yet provides good striking performance. Capacitor C4 discharges as soon as an attempt is made to strike the arc, and assists by providing sharp peaks of current during striking. The variable resistor VR2 is set during an open circuit condition across the terminals 16 and 18 to adjust the no-load frequency of oscillation of 1C2.

The potentiometer VR1 is set by the welding operator to obtain the best welding current for the job in hand. During normal operating conditions, the converter will deliver substantially constant power to the load, the magnitude of the power depending on the setting of the potentiometer VR1. The output current will automatically rise when the load voltage drops, and vice versa. During this mode of operation, the control circuit merely acts to provide a predetermined operating frequency of the converter depending on the power required to be delivered to the output.

It is only when the load approaches predetermined upper and lower impedance threshold values that the control circuit overrides the normal mode setting of VR1 to control the converter to operate within safe operating limits. During open circuit, the standby power consumption from the utility supply will amount to as little as 1.5 watts. At full power, the utility supplied AC input current to the converter will be approximately 28 amps r.m.s, which is similar to other inverter-controlled input currents delivering only 140 amps DC output, all other conditions being equal.

It must be appreciated that the exact values of the various components will depend on the application of the converter. The optimum design and component values can only be determined by trial and error, as will be understood by those skilled in the art.

Apart from welding equipment, other variable impedance loads, such as a battery or a dc motor, may also be powered by the power converter of the invention.

Figure 2:
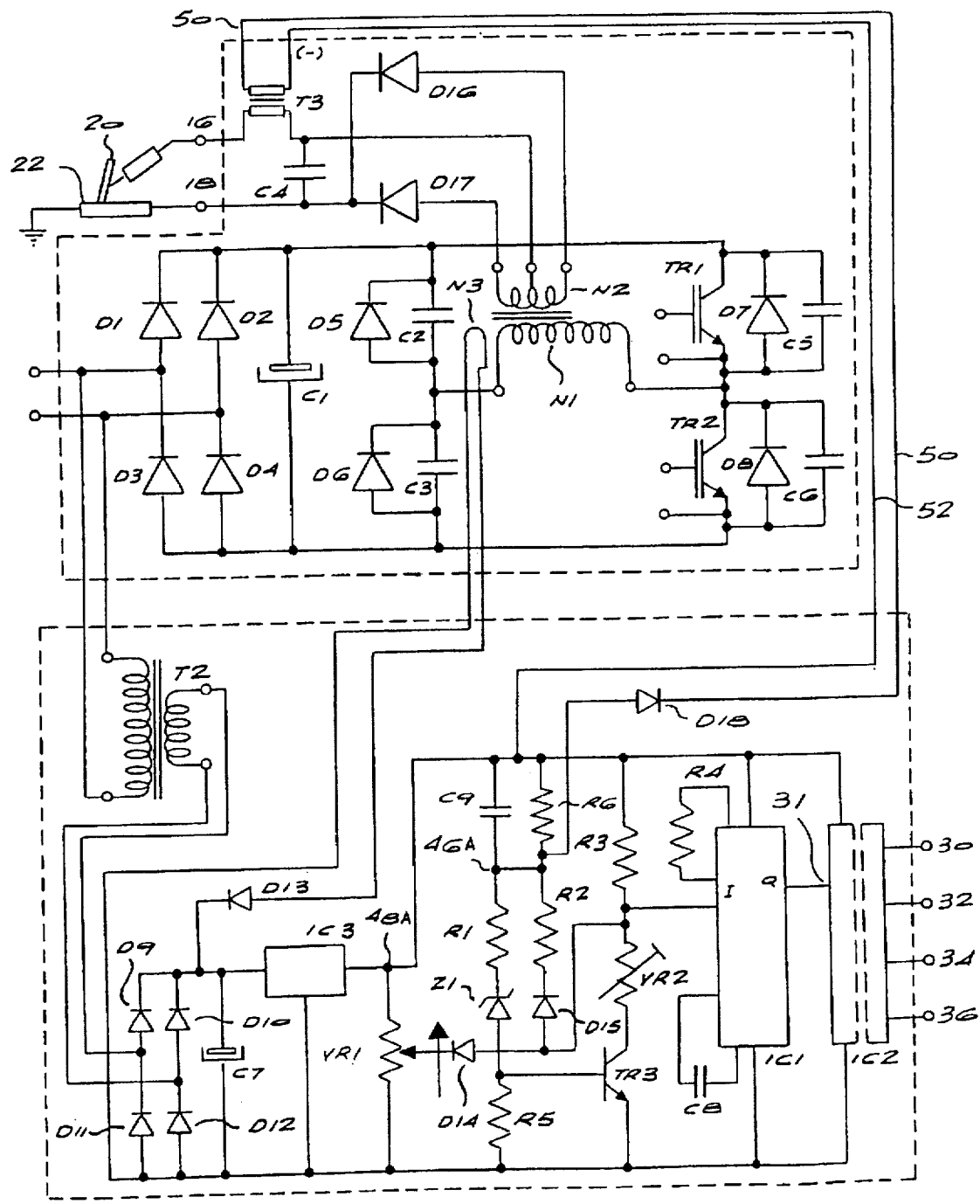
FIG. 2 is a circuit diagram of an alternative sensing device for the welder shown in FIG. 1.

Instead of monitoring the output voltage and therefrom controlling the operation of the converter as described, it is feasible to monitor the output current, and to proceed along essentially the same lines to control the operation of the converter by the control circuit. With reference to FIG. 2, additional components for monitoring current include a dc-to-dc current transformer T3, a diode D18, a load resistor R6 and a smoothing capacitor C9. A positive lead 50 of the current transformer T3 is connected to the output of the IC3 and a negative lead 52 is connected via diode D18 to a common node 46A to which the parallel resistors R1 and R2 are connected. The operation of a converter and control circuit in which the output current is essentially monitored is the same as described above with reference to the voltage sensing embodiment.

The output of the transformer T3 is calibrated to deliver −15 volts to the common node of the resistors R1 and R2. The Zener diode Z1 is rated at is 13.5 to 14 volts. At normal output neither resistor R1 nor R2 will have current flowing through it. Therefore the VCO will be running at its "normal" frequency determined by the voltage at node 48A.

As the drops of metal are transferred from the welding rod, the output current of the converter will rise, presenting a reduced voltage at the sensing node 46A. The diode D15 will be forward biased and the input reference voltage to the VCO IC1 will be reduced, with the same results as before.

As the drops clear and normal impedance is re-established, the output current is reduced and the normal mode VCO frequency is restored.

Upon lifting the rod completely away from the workpiece the arc will be extinguished completely, and the current will immediately fall to zero. The voltage at the sensing node 46A will rise to +15 volts, turning on zener Z1 and the transistor TR3 and consequently reducing the frequency of the VCO to practically zero, as before.

The sole purpose of including capacitor C9 is to maintain a voltage at the junction of resistor R1 and R2 long enough to keep the VCO frequency down for about one cycle after a high current peak.

It must be understood that the series resonant converter circuit shown in FIG. 1 is merely an example of a cyclic reactive energy storage circuit. Other cyclic reactive energy storage circuits which are arranged to deliver a constant power output to a variable impedance lead under normal load conditions may be used.

The preferred embodiment of the invention is a voltage monitoring embodiment of FIG. 1. As a result of the convertor being arranged to supply power derived from substantially constant power pulses in accordance with formula (1), any rise or fall in current through the load will result in an inversely proportional fall or rise in voltage. Voltage sensing componentry, such as resistors, are generally more economical and less bulky than current sensing components, such as current transformers or the like.

An advantage of the power convertor of the invention is that it supplies substantially constant power under normal load conditions and automatically adjusts its output power level under abnormal short and open circuit load conditions in which the maintenance of the normal load power level would, in the case of a short circuit, result in an unacceptable and potentially damaging rise in current.

We claim:

1. A power converter comprising a power supply circuit arranged to supply power to a load of dynamically varying impedance and a control circuit for controlling the operation of the power supply circuit, the control circuit including first sensing means for sensing a variation in load impedance below a lower threshold value, and first regulating means responsive to the sensing means for reducing the power supplied to the load, the control circuit being arranged to operate the power supply circuit without feedback and at a desired power level in a first normal load mode when the impedance of the load is above the threshold value wherein the power supplied to the load is maintained at a substantially constant level, and a second reduced load mode when the impedance of the load is below the threshold value, wherein the power supply circuit is operated in a first feedback mode and the level of power supplied to the load is reduced so as to limit a rise in current through the load, and wherein the control circuit includes second sensing means for sensing a variation in load impedance above an upper threshold value, and second regulating means responsive to the second sensing means arranged to operate the power supply circuit in a second feedback mode for increasing the voltage across the load when the load impedance is above the upper threshold value.

2. A power converter according to claim 1 in which the first sensing means is coupled to an output of the power supply circuit, the control circuit includes a sub-controller, and the first sensing means and the first regulating means are arranged to lower an input control signal to the sub-controller.

3. A power convertor according to claim 1 in which the first sensing means comprises first voltage sensing means for sensing a drop in voltage across the load below a predetermined threshold, the drop in voltage arising from an increase in current through the load.

4. A power convertor according to claim 1 in which the first sensing means comprises first current sensing means for sensing an increase in current through the load above a predetermined threshold, the increase in current arising from a voltage drop across the load.

5. A power convertor according to claim 2 in which the first regulating means is arranged to lower the input control signal by sinking current via the first sensing means.

6. A power convertor according to claim 2 in which the input control signal comprises a DC reference voltage, and the control circuit includes a DC voltage source for supplying the reference voltage to the sub-controller, and adjustment means operative in the normal load mode for manually adjusting the DC voltage source for varying the level of substantially constant power supplied to the load.

7. A power convertor according to claim 6 in which the sub-controller comprises a voltage controlled oscillator arranged to supply variable frequency pulses to controlled switches forming part of the power supply circuit.

8. A power convertor according to claim 1 in which the power supply circuit includes a reactive energy storage circuit with the power supplied to the load being derived from discrete substantially constant power pulses.

9. A power convertor according to claim 8 in which the output power level of the convertor is determined by the frequency or duty cycle of the power pulses.

10. A power convertor according to claim 2 in which the first sensing means comprises a voltage sensing line coupled between an output of the power supply circuit and an input of the sub-controller, and the first regulating means includes reverse biasing means for preventing current from flowing from the load via the sensing line in the event of the voltage at the output of the power supply circuit exceeding the voltage at the input of the sub-controller and for allowing current to flow in the opposite direction in the event of the voltage at the input of the sub-controller exceeding the voltage at the output of the power supply circuit by a predetermined value.

11. A power converter according to claim 1 in which the second sensing means is coupled directly to an output of the power supply circuit, the control circuit includes a sub-controller, and the second sensing and second regulating means are arranged to lower an input control signal to an input of the sub-controller.

12. A power converter according to claim 11 in which the second regulating means includes a voltage reference means which is arranged to conduct in the event of the voltage at the output of the power supply exceeding the voltage of the input control signal by a predetermined value, and switching means responsive to conduction of the voltage reference means, the switching means being arranged to divert current from the input of the sub-controller.

13. A power converter according to claim 12 in which the sub-controller is a voltage controlled oscillator having an output coupled to a firing circuit, and the power supply circuit is a converter circuit which is provided with at least two controlled switches arranged to receive pulsed signals from the firing circuit, and further arranged to operate in a high output voltage mode in response to the frequency of the pulsed signals falling below a predetermined threshold.

14. A method of controlling a power convertor comprising a power supply circuit arranged to supply power at a substantially constant level to a load of variable impedance and a control circuit for controlling the operation of the power supply circuit, the method including the steps of:

a) sensing the load impedance;

b) operating the power supply circuit in a first normal load mode in the event of the impedance of the load being above a first lower threshold value by maintaining the power supplied to the load at a substantially constant level;

c) operating the power supply circuit in a second reduced load mode in the event of the impedance of the load being below the first threshold value by reducing the level of power supplied to the load so as to limit a rise in current through the load; and d) operating the power supply circuit in a third increased load mode in the event of the impedance of the load being above an upper threshold value so as to increase the voltage across the load.

15. A method of controlling a power convertor according to claim 14 in which the load impedance is sensed by sensing a variation in voltage across the load arising from an inversely proportional variation in current through the load.

* * * * *